US010318183B1

(12) United States Patent
Tylik et al.

(10) Patent No.: US 10,318,183 B1
(45) Date of Patent: Jun. 11, 2019

(54) STORAGE MANAGEMENT SYSTEM AND METHOD

(71) Applicant: EMC Corporation, Hopkinton, MA (US)

(72) Inventors: Dmitry Tylik, Westborough, MA (US); Sergey Alexeev, St. Petersburg (RU); Alexey Shusharin, St. Petersburg (RU); Alexey Martynov, St. Petersburg (RU); Eugeny Novozhilov, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 153 days.

(21) Appl. No.: 14/755,630

(22) Filed: Jun. 30, 2015

(51) Int. Cl.
G06F 3/06 (2006.01)
(52) U.S. Cl.
CPC .......... G06F 3/0619 (2013.01); G06F 3/0665 (2013.01); G06F 3/0689 (2013.01)
(58) Field of Classification Search
CPC ..... G06F 3/0619; G06F 3/0665; G06F 3/0689
USPC ........ 711/114; 719/320, 324, 325, 326, 327, 719/328, 329; 707/602, 756, 761, 790, 707/791, 792, 793, 796, 802, 809, 810, 707/975
See application file for complete search history.

(56) References Cited

U.S. PATENT DOCUMENTS

| 6,519,679 | B2* | 2/2003 | Devireddy | G06F 3/0605 711/114 |
| 7,401,338 | B1* | 7/2008 | Bowen | H04L 41/5035 709/200 |
| 7,526,503 | B2* | 4/2009 | Bernstein | G06F 17/30587 |
| 7,809,739 | B2* | 10/2010 | Allen | G06F 9/5011 707/758 |
| 8,082,330 | B1* | 12/2011 | Castelli | G06F 9/5016 709/220 |
| 8,255,803 | B1* | 8/2012 | McAdam | G06F 3/0605 711/114 |
| 2004/0030822 | A1* | 2/2004 | Rajan | G06F 3/0605 711/4 |
| 2013/0036091 | A1* | 2/2013 | Provenzano | G06F 17/30162 707/624 |
| 2015/0058555 | A1* | 2/2015 | Karamanolis | G06F 3/0689 711/114 |
| 2015/0227602 | A1* | 8/2015 | Ramu | G06F 17/30575 707/634 |

OTHER PUBLICATIONS

Carlson, M. A., "Storage Management: SMI-S to Management Frameworks", 2008, Storage Networking Industry Association (SNIA).*

(Continued)

Primary Examiner — Reginald G Bragdon
Assistant Examiner — Aaron D Ho
(74) Attorney, Agent, or Firm — Brian J. Colandreo; Heath M. Sargeant; Holland & Knight LLP

(57) ABSTRACT

A method, computer program product, and computing system for defining a UIS layer within a storage management application, wherein the UIS layer is configured to perform operations including object management within a storage system. A System API layer is defined within the storage management application, wherein the System API layer is positioned beneath the UIS layer and is configured to perform operations including persistence object management within the storage system.

23 Claims, 4 Drawing Sheets

(56) References Cited

OTHER PUBLICATIONS

Thatte, S. M., "Persistent memory: A storage architecture for object-oriented database systems," in PTOC. 1986 International workshop on Object Oriented Database Systems, pp. 148-159, Sep. 1986.*

* cited by examiner

STORAGE MANAGEMENT SYSTEM AND METHOD

TECHNICAL FIELD

This disclosure relates to storage management systems and, more particularly, to storage management systems for use within storage systems.

BACKGROUND

Storage systems typically include various hardware components (e.g., storage processors, disk drives, and power supplies). These storage systems may provide services over multiple network connections that expose different protocols. Many logical resources (e.g., storage pools, LUNs, file systems) may be created, monitored and modified within these storage systems.

The various hardware resources and logical resources within these storage systems may be provisioned, configured and monitored via storage management software, wherein this storage management software may include multiple layers that require transformations to occur when data/objects are transferred between these layers.

SUMMARY OF DISCLOSURE

In one implementation, a computer-implemented method is executed on a computing device. The computer-implemented method includes defining a UIS layer within a storage management application, wherein the UIS layer is configured to perform operations including object management within a storage system. A System API layer is defined within the storage management application, wherein the System API layer is positioned beneath the UIS layer and is configured to perform operations including persistence object management within the storage system.

One or more of the following features may be included. An interface layer may be defined within the storage management application, wherein the interface layer is positioned above the UIS layer. The UIS layer may be further configured to perform operations including one or more of: Task services management within the storage system; and User services management within the storage system. The System API layer may be further configured to perform operations including one or more of: System API method management; Systems API object management; and System API database cache management. Persistence object management may include one or more of: the creation of one or more persistence objects within the storage system; the deletion of one or more persistence objects within the storage system; and the modification of one or more persistence objects within the storage system. Object management may include one or more of: the creation of one or more objects within the storage system; the deletion of one or more objects within the storage system; and the modification of one or more objects within the storage system. The one or more objects may include one or more of: storage pools within the storage system; file systems within the storage system; and LUNs within the storage system. One or more objects within the System API layer of the storage management application may be transformed into one or more objects in the UIS layer of the storage management application using a declarative model transformation tool.

In another implementation, a computer program product resides on a computer readable medium and has a plurality of instructions stored on it. When executed by a processor, the instructions cause the processor to perform operations including defining a UIS layer within a storage management application, wherein the UIS layer is configured to perform operations including object management within a storage system. A System API layer is defined within the storage management application, wherein the System API layer is positioned beneath the UIS layer and is configured to perform operations including persistence object management within the storage system.

One or more of the following features may be included. An interface layer may be defined within the storage management application, wherein the interface layer is positioned above the UIS layer. The UIS layer may be further configured to perform operations including one or more of: Task services management within the storage system; and User services management within the storage system. The System API layer may be further configured to perform operations including one or more of: System API method management; Systems API object management; and System API database cache management. Persistence object management may include one or more of: the creation of one or more persistence objects within the storage system; the deletion of one or more persistence objects within the storage system; and the modification of one or more persistence objects within the storage system. Object management may include one or more of: the creation of one or more objects within the storage system; the deletion of one or more objects within the storage system; and the modification of one or more objects within the storage system. The one or more objects may include one or more of: storage pools within the storage system; file systems within the storage system; and LUNs within the storage system. One or more objects within the System API layer of the storage management application may be transformed into one or more objects in the UIS layer of the storage management application using a declarative model transformation tool.

In another implementation, a computing system including a processor and memory is configured to perform operations including defining a UIS layer within a storage management application, wherein the UIS layer is configured to perform operations including object management within a storage system. A System API layer is defined within the storage management application, wherein the System API layer is positioned beneath the UIS layer and is configured to perform operations including persistence object management within the storage system.

One or more of the following features may be included. An interface layer may be defined within the storage management application, wherein the interface layer is positioned above the UIS layer. The UIS layer may be further configured to perform operations including one or more of: Task services management within the storage system; and User services management within the storage system. The System API layer may be further configured to perform operations including one or more of: System API method management; Systems API object management; and System API database cache management. Persistence object management may include one or more of: the creation of one or more persistence objects within the storage system; the deletion of one or more persistence objects within the storage system; and the modification of one or more persistence objects within the storage system. Object management may include one or more of: the creation of one or more objects within the storage system; the deletion of one or more objects within the storage system; and the modification of one or more objects within the storage system. The one or more objects may include one or more of: storage pools within the storage system; file systems within the storage system; and LUNs within the storage system. One or more objects within the System API layer of the storage management application may be transformed into one or more objects in the UIS layer of the storage management application using a declarative model transformation tool.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
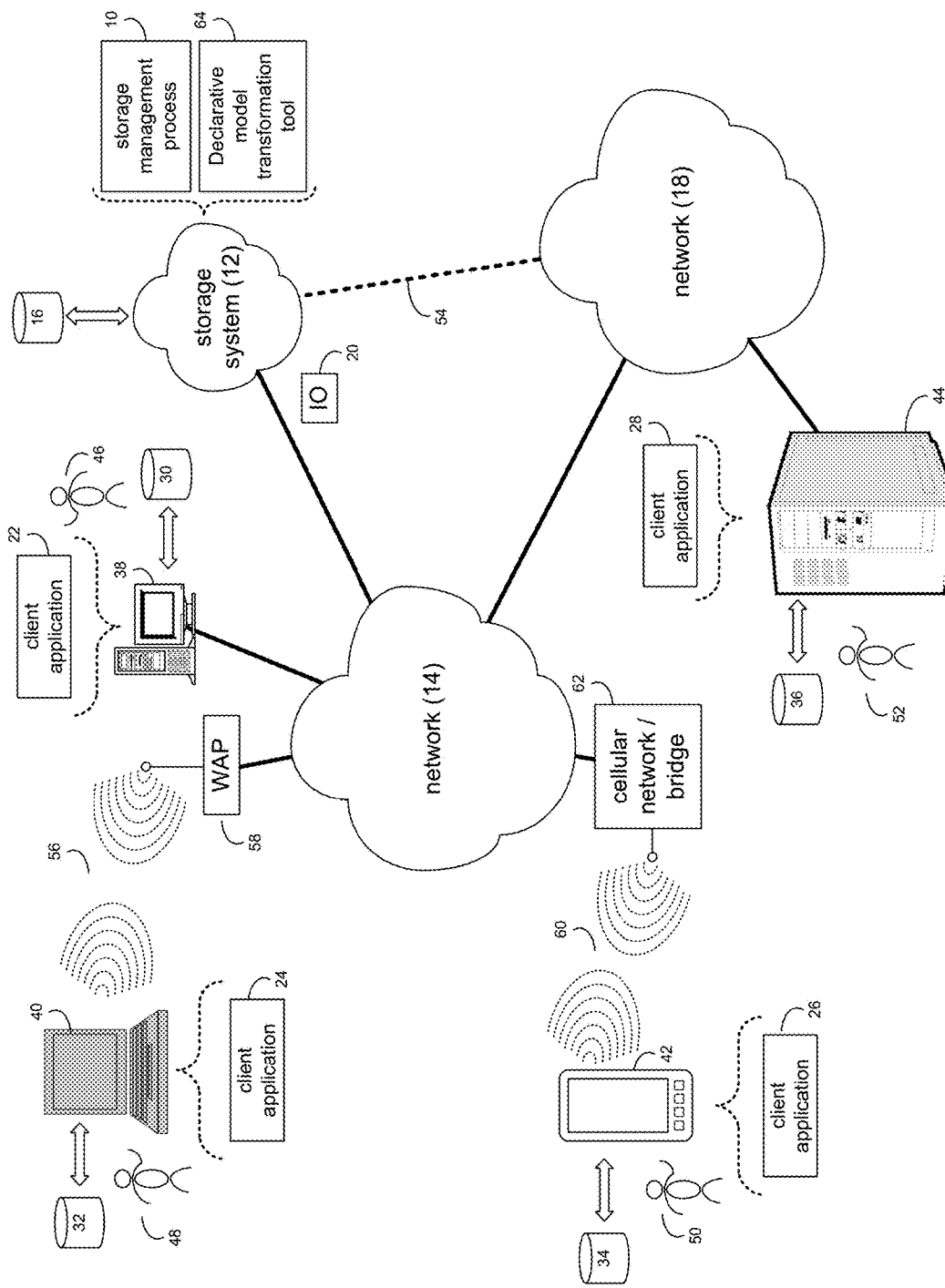
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), one or more personal computers, one or more server computers, and a cloud-based platform.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: a Windows™ operating system; a Linux™ operating system, a Unix™ operating system or a custom operating system.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, server computer 44, a notebook computer (not shown), a personal digital assistant (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, server computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Mac™, Redhat Linux™, or a custom operating system.

The Storage System:

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
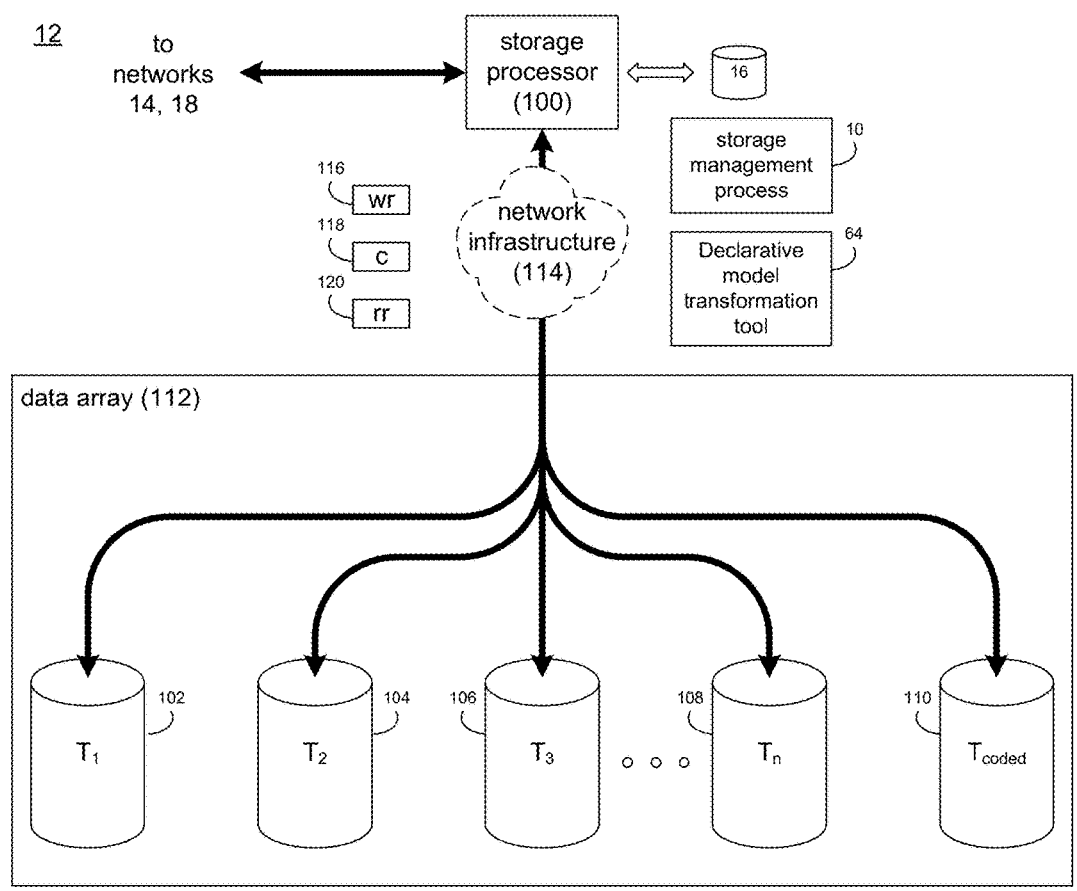
FIG. 2 is a diagrammatic view of the storage system of FIG. 1.

Referring also to FIG. 2, storage system 12 may include one or more storage processors (e.g., storage processor 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be an NAS or a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
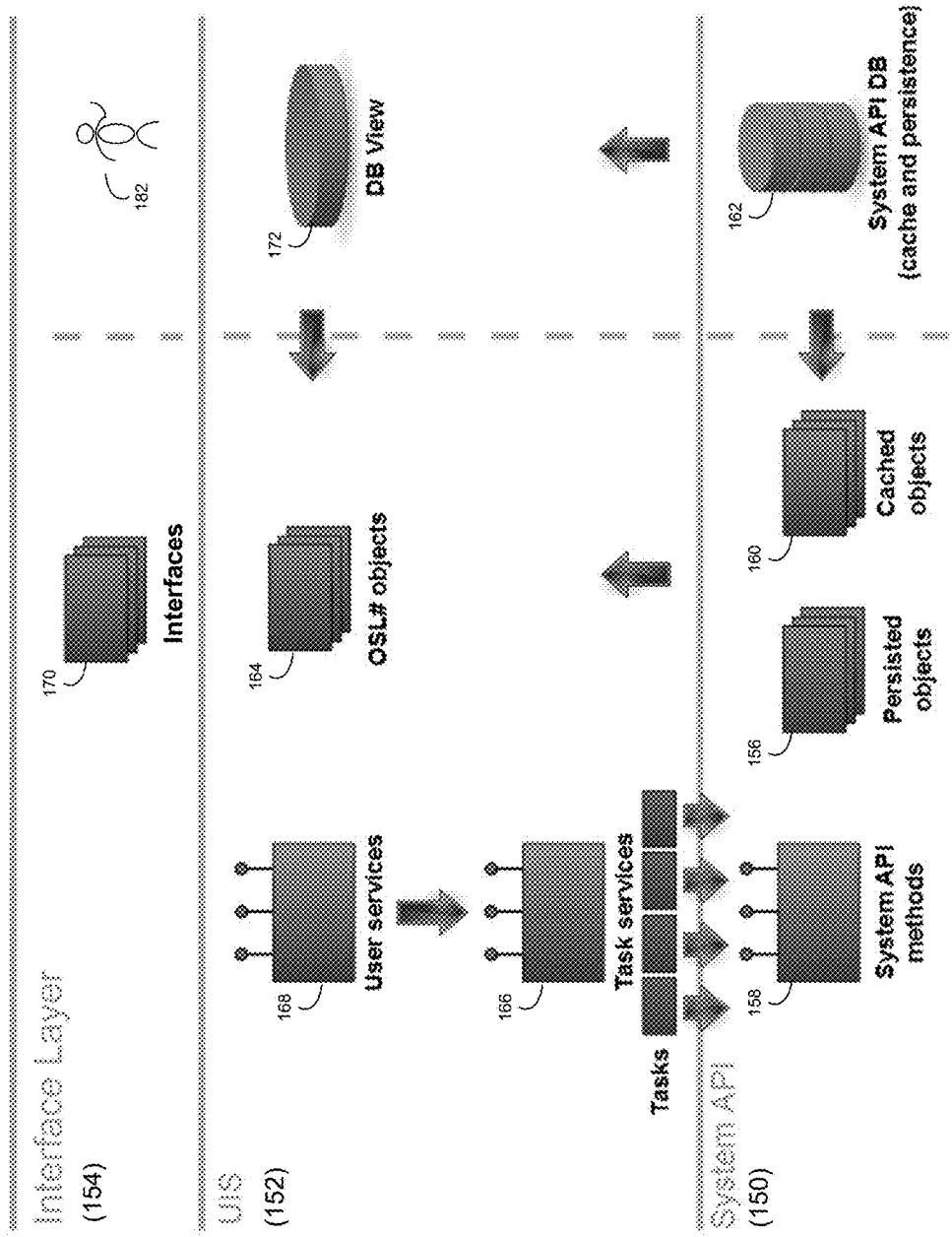
FIG. 3 is a diagrammatic view of the storage management process of FIG. 1.
Figure 4:
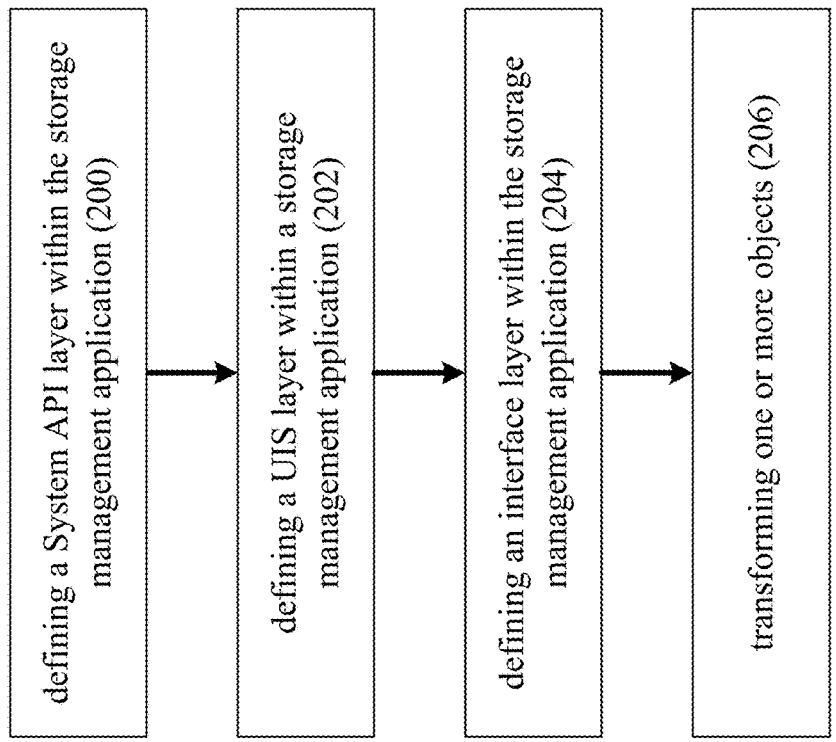
FIG. 4 is a flow chart of the storage management process of FIG. 1.

Storage Management Process:

For illustrative purposes and referring also to FIGS. 3-4, storage management process 10 may include multiple model layers (e.g., layers 150, 152, 154) with varying degrees of modeling abstraction (e.g., "higher order layers" are built on top of "lower order layers"). For example, System API layer 150 may be configured as the lowest layer, wherein UIS layer 152 is a higher order layer that is built upon System API layer 150, and Interface layer 154 is a higher order layer that is built upon UIS layer 152.

Accordingly, storage management process 10 may define 200 System API layer 150 within storage management application 10. As discussed above, System API layer 150 may be a base layer within storage management process 10.

Further, storage management process 10 may define 202 UIS layer 152 within storage management application 10. Further and as discussed above, UIS layer 152 may be a higher order layer that is built upon System API layer 150 within storage management process 10.

Additionally, storage management process 10 may define 204 interface layer 154 within storage management application 10. Additionally and as discussed above, interface layer 154 may be a higher order layer that is built upon UIS layer 152 within storage management process 10.

System API layer 150 may be configured to perform operations within storage system 12 including but not limited to persistence object management. Persistence object management (within System API layer 150) may include one or more of: the creation/deletion and/or modification of one or more persistence objects 156 within storage system 12, wherein persistence objects 156 may define the configuration of storage system 12.

As discussed above, storage system 12 may include one or more storage processors (e.g., storage processor 100) and a plurality of storage targets T 1-*n* (e.g. storage targets 102, 104, 106, 108), wherein this plurality of storage targets T 1-*n* (e.g. storage targets 102, 104, 106, 108) may be configured to form/define various RAID arrays (e.g., RAID 0, RAID 1, RAID 3, RAID 4, RAID 5 or RAID 6). Accordingly, one or more of persistence objects 156 may define the various intangible aspects of storage system 12, such as identifying any electronic licenses utilized by storage system 12, as well as any other entities that are not present as a physical object within storage system 12.

System API layer 150 may further be configured to perform operations within storage system 12 including but not limited to System API method management (i.e. the management of System API methods 158 within storage system 12); Systems API object management (i.e. the management of objects 156, 160 within storage system 12); and System API database cache management (i.e. the management of System API database 162 within storage system 12). Accordingly, cached objects 160 may generally define the configuration of storage targets 102, 104, 106, 108 (e.g., the configuration of the various RAID arrays, storage pools, file systems, and LUNs defined within storage system 12).

As is known in the art, an API (i.e., an Application Program Interface) is a software intermediary that allows portions of programs/applications to interact/communicate with each other and share/exchange data; while protecting other portions of these programs/applications. Accordingly, System API layer 150 may be configured to manage System API methods 158, System API objects 156, 160, and System API database 162 included/defined within System API layer 150 of storage system 12.

UIS layer 152 (which may be positioned above System API layer 150) may be configured to perform operations including but not limited to object management within storage system 12. Object management (within UIS layer 152) may include one or more of: the creation/deletion/modification of one or more objects 164 within storage system 12. Examples of objects 164 may include but are not limited to various logical objects defined within storage system 12, such as: storage pools defined within e.g. storage targets 102, 104, 106, 108 of storage system 12; file systems defined within e.g. storage targets 102, 104, 106, 108 of storage system 12; and LUNs defined within e.g. storage targets 102, 104, 106, 108 of storage system 12.

UIS layer 152 may be further configured to perform operations including but not limited to Task services management (i.e. the management of Task services 166 within storage system 12); and User services management (i.e. the management of User services 168 within storage system 12).

Interface layer 154 (which may be positioned above UIS layer 152) may be configured to manage interfaces 170 (e.g., CLI interfaces, GUI interfaces, and REST API interfaces) so that storage administrators (e.g., administrator 182) may accomplish various management tasks (e.g., the defining of new objects within storage system 12).

As discussed above, since storage management process 10 includes multiple model layers (e.g., System API layer 150 configured as the lowest layer; UIS layer 152 being a higher order layer that is built upon System API layer 150; and Interface layer 154 being a higher order layer that is built upon UIS layer 152), transformations may be required when data/objects are transferred between these layers.

Accordingly, storage management process 10 may leverage declarative Management Model transformations (instead of iterative routines that were traditionally implemented in the C++ programming language) using a declarative model transformation tool (e.g., SQL View). Specifically, storage management process 10 may transform 206 one or more objects (e.g., System API objects 156, 160) that may be stored within System API database 162 of System API layer 150 of the storage management application (e.g., storage management process 10) into one or more objects (e.g., objects 164) in UIS layer 152 of the storage management application (e.g., storage management process 10) using declarative model transformation tool 64 (e.g., SQL View) and rules (not shown) defined within rules database 172.

Further and through the use of storage management process 10, enhanced efficiency may be achieved. For example, System API layer 150 may be generally more granular and may be for internal system usage; while UIS layer 152 may be generally less granular and may be consumed/used directly, as well as e.g., be used to build some standard compliant interfaces (e.g. SMI-S) on top of it.

Accordingly and through the use of storage management process 10, a system may be achieved that:

is easier to change/extend since "higher order" objects may be declared as a transformation on top of a "lower order" object (instead of needing to develop iterative C++ code that builds "higher order" objects on top of "lower order" objects).

As there is a reduced number of layers in the system, the required development effort may be reduced.

Each object UIS layer 152 may be built in runtime in a single PostgreSQL translation.

REST API implementations may read the model directly from a PostgreSQL database, thus improving scalability.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
defining, at the computing device, a first layer within a storage management application, wherein the first layer is configured to perform operations including object management within a storage system, wherein the storage system includes a storage processor communicatively coupled to a plurality of storage targets and wherein the storage processor is configured to process one or more IO requests addressed to the plurality of storage targets;
defining a System API layer within the storage management application, wherein the System API layer is positioned beneath the first layer and is configured to perform operations including persistence object management and System API database cache management within the storage system, wherein the System API layer includes one or more objects within a System API database configured to define a configuration of the storage system, wherein the one or more objects in the System API layer include one or more persistence objects configured to identify electronic licenses utilized by the storage system and one or more cached objects configured to define the configuration of one or more storage targets of the plurality of storage targets in the storage system;
transforming the one or more objects, including a System API object, within the System API database in the System API layer of the storage management application into one or more objects, including a logical object, in the first layer of the storage management application using a declarative model transformation tool, wherein a configuration of each of the one or more objects within the first layer is based upon, at least in part, the configuration of the storage system defined by the one or more objects within the System API database in the System API layer, wherein transforming includes transferring the logical object, transformed from the System API object, to the first layer of the storage management application; and processing, via the storage processor, the one or more IO requests addressed to the plurality of storage targets based upon, at least in part, the configuration of the one or more objects within the first layer of the storage management application.

2. The computer-implemented method of claim 1 further comprising:

defining an interface layer within the storage management application, wherein the interface layer is positioned above the first layer.

3. The computer-implemented method of claim 1 wherein the first layer is further configured to perform operations including one or more of:

Task services management within the storage system; and
User services management within the storage system.

4. The computer-implemented method of claim 1 wherein the System API layer is further configured to perform operations including one or more of:

System API method management; and
System API object management.

5. The computer-implemented method of claim 1 wherein persistence object management includes one or more of:

creation of one or more persistence objects within the storage system;
deletion of one or more persistence objects within the storage system; and
modification of one or more persistence objects within the storage system.

6. The computer-implemented method of claim 1 wherein object management includes one or more of:

creation of one or more objects within the storage system;
deletion of one or more objects within the storage system; and
modification of one or more objects within the storage system.

7. The computer-implemented method of claim 6 wherein the one or more objects within the storage system include one or more of:

storage pools within the storage system;
file systems within the storage system; and
LUNs within the storage system.

8. The computer-implemented method of claim 1, wherein the declarative model transformation tool is SQL View.

9. A computer program product residing on a non-transitory computer readable medium having a plurality of instructions stored thereon which, when executed by a processor, cause the processor to perform operations comprising:

defining a first layer within a storage management application, wherein the layer is configured to perform operations including object management within a storage system, wherein the storage system includes a storage processor communicatively coupled to a plurality of storage targets and wherein the storage processor is configured to process one or more IO requests addressed to the plurality of storage targets;

defining a System API layer within the storage management application, wherein the System API layer is positioned beneath the first layer and is configured to perform operations including persistence object management and System API database cache management within the storage system, wherein the System API layer includes one or more objects within a System API database configured to define a configuration of the storage system, wherein the one or more objects in the System API layer include one or more persistence objects configured to identify electronic licenses utilized by the storage system and one or more cached objects configured to define the configuration of one or more storage targets of the plurality of storage targets in the storage system;

transforming the one or more objects, including a System API object, within the System API database in the System API layer of the storage management application into one or more objects, including a logical object, in the first layer of the storage management application using a declarative model transformation tool, wherein a configuration of each of the one or more objects within the first layer is based upon, at least in part, the configuration of the storage system defined by the one or more objects within the System API database in the System API layer, wherein transforming includes transferring the logical object, transformed from the System API object, to the first layer of the storage management application; and processing, via the storage processor, the one or more IO requests addressed to the plurality of storage targets based upon, at least in part, the configuration of the one or more objects within the layer of the storage management application.

10. The computer program product of claim 9 further comprising:

defining an interface layer within the storage management application, wherein the interface layer is positioned above the first layer.

11. The computer program product of claim 9 wherein the first layer is further configured to perform operations including one or more of:

Task services management within the storage system; and
User services management within the storage system.

12. The computer program product of claim 9 wherein the System API layer is further configured to perform operations including one or more of:

System API method management;
System API object management.

13. The computer program product of claim 9 wherein persistence object management includes one or more of:

creation of one or more persistence objects within the storage system;
deletion of one or more persistence objects within the storage system; and
modification of one or more persistence objects within the storage system.

14. The computer program product of claim 9 wherein object management includes one or more of:

creation of one or more objects within the storage system;
deletion of one or more objects within the storage system; and
modification of one or more objects within the storage system.

15. The computer program product of claim 14 wherein the one or more objects within the storage system include one or more of:
- storage pools within the storage system;
- file systems within the storage system; and
- LUNs within the storage system.

16. The computer program product of claim 9, wherein the declarative model transformation tool is SQL View.

17. A computing system including a processor and memory configured to perform operations comprising:
- defining a first layer within a storage management application, wherein the first layer is configured to perform operations including object management within a storage system, wherein the storage system includes a storage processor communicatively coupled to a plurality of storage targets and wherein the storage processor is configured to process one or more IO requests addressed to the plurality of storage targets;
- defining a System API layer within the storage management application, wherein the System API layer is positioned beneath the first layer and is configured to perform operations including persistence object management and System API database cache management within the storage system, wherein the System API layer includes one or more objects within a System API database configured to define a configuration of the storage system, wherein the one or more objects in the System API layer include one or more persistence objects configured to identify electronic licenses utilized by the storage system and one or more cached objects configured to define the configuration of one or more storage targets of the plurality of storage targets in the storage system;
- transforming the one or more objects, including a System API object, within the System API database in the System API layer of the storage management application into one or more objects, including a logical object, in the first layer of the storage management application using a declarative model transformation tool, wherein a configuration of each of the one or more objects within the first layer is based upon, at least in part, the configuration of the storage system defined by the one or more objects within the System API database in the System API layer, wherein transforming includes transferring the logical object, transformed from the System API object, to the first layer of the storage management application; and
- processing, via the storage processor, the one or more IO requests addressed to the plurality of storage targets based upon, at least in part, the configuration of the one or more objects within the layer of the storage management application.

18. The computing system of claim 17 further configured to perform operations comprising:
- defining an interface layer within the storage management application, wherein the interface layer is positioned above the first layer.

19. The computing system of claim 17 wherein the first layer is further configured to perform operations including one or more of:
- Task services management within the storage system; and
- User services management within the storage system.

20. The computing system of claim 17 wherein the System API layer is further configured to perform operations including one or more of:
- System API method management;
- System API object management.

21. The computing system of claim 17 wherein persistence object management includes one or more of:
- creation of one or more persistence objects within the storage system;
- deletion of one or more persistence objects within the storage system; and
- modification of one or more persistence objects within the storage system.

22. The computing system of claim 17 wherein object management includes one or more of:
- creation of one or more objects within the storage system;
- deletion of one or more objects within the storage system; and
- modification of one or more objects within the storage system.

23. The computing system of claim 17, wherein the declarative model transformation tool is SQL View.

* * * * *